United States Patent [19]

Shimomura

[11] Patent Number: 4,762,055
[45] Date of Patent: Aug. 9, 1988

[54] COFFEE MAKERS

[75] Inventor: Nobuo Shimomura, Nagoya, Japan

[73] Assignee: Kabushiki Kaisha Toshiba, Kawasaki, Japan

[21] Appl. No.: 131,436

[22] Filed: Dec. 11, 1987

[30] Foreign Application Priority Data

Feb. 23, 1987 [JP] Japan .............................. 62-039835

[51] Int. Cl.4 ......................... A47J 31/42; A47J 31/52
[52] U.S. Cl. ........................................ 99/285; 99/280; 219/308
[58] Field of Search .................. 99/279, 280, 281, 282, 99/283, 285, 295, 299, 300, 304, 305; 426/433; 219/308

[56] References Cited

U.S. PATENT DOCUMENTS

| | | | |
|---|---|---|---|
| 4,330,702 | 5/1982 | Cheng | 219/308 |
| 4,418,614 | 12/1983 | Oota | 99/285 |
| 4,566,374 | 1/1986 | Medema | 99/285 |
| 4,638,147 | 1/1987 | Pytch | 219/308 |

Primary Examiner—Robert W. Jenkins
Attorney, Agent, or Firm—Foley & Lardner, Schwartz, Jeffery, Schwaab, Mack, Blumenthal & Evans

[57] ABSTRACT

A coffee maker includes a water reservoir, a drip case for containing coffee powder, a heating pipe for heating water fed from the water reservoir through one of two ends thereof and for feeding hot water to the drip case from the other end, a heater for applying heat to the heating pipe through a heat-transferring plate to cause the hot water to flow through the heating pipe to the end communicating to the drip case, by the force of boiling pressure, a temperature sensor for sensing the temperature of the heat-transferring plate, a first comparator for deciding a time period required to increase the temperature of the heat-transferring plate to reach a predetermined value, in response to a decision signal from the temperature sensor, and a second comparator for comparing the time period decided by the first comparator with a predetermined value to produce an alarm signal in case that the time period decided by the first comparator takes a smaller value than the predetermined value. Accordingly, when the effective cross sectional area of the heating pipe is decreased to a large extent owing to the affixing of the incrustations and the like, a user is automatically alarmed.

2 Claims, 5 Drawing Sheets

COFFEE MAKERS

BACKGROUND OF THE INVENTION

1. Field of the Invention

The present invention relates generally to coffee makers including hot water feeding means such as a heating pipe provided between a water reservoir and a drip case for containing coffee powder and heating means for applying heat to the hot water feeding means to heat water therein, thereby feeding the hot water to the drip case by the force of vapor pressure at the boiling point (boiling pressure), for the extraction of coffee, and more particularly to coffee makers incorporating a mechanism for detecting and informing an operator of an abnormal state of the hot water feeding means with regard to the feeding of hot water.

2. Description of the Prior Art

The coffee makers of the above-mentioned type generally comprise hot water feeding means such as a heating pipe and heating means or a heater. One of two ends of the heating pipe communicates to the bottom of a water reservoir and the other end thereof is positioned over a drip case for containing coffee powder. The heater is attached to a suitable portion of the heating pipe so that water in the heating pipe is heated. When a user makes coffee with the above-described coffee maker, the heater is energized after the drip case is supplied with a desired amount of coffee powder with the water reservoir filled with water. Upon energization of the heater, the water supplied from the water reservoir to the heating pipe is heated. The boiling pressure causes the hot water to flow through the heating pipe to the end thereof positioned over the drip case. The hot water is dripped down into the drip case in which the coffee powder is contained. The above-described hot water feeding operation is reiterated and completed when all of the water in the water reservoir is heated and fed into the drip case. The hot water thus fed into the drip case is brought into contact with the coffee powder, thereby obtaining coffee extracts. The hot water containing the coffee extracts is dripped down into a container provided below the drip case, thereby obtaining coffee.

According to the above-described coffee maker, a small amount of water is left in the heating pipe even after the extraction of coffee. Since a remaining heat is applied to the water left in the heating pipe, the water left in the heating pipe is heated and boiled. However, when the coffee maker is reiteratively used for a long period, the reiterative remaining of the water in the heating pipe and the boiling of it result in the affixing of incrustations and the like on the inside surface of the heating pipe, thereby reducing an effective cross sectional area of the heating pipe. When the effective cross sectional area of the heating pipe is decreased, the amount of hot water flowing in the heating pipe is decreased, thereby prolonging the period of time required to extract coffee. Further progress of the affixing of the incrustations and the like results in further decrease of the water flowing in the heating pipe, thereby decreasing an amount of heat consumed. Consequently, the circumference of the heater is in danger of being exposed to excessive heat.

Whereas, the prior art has provided a coffee maker wherein a temperature-sensing switch is provided in the vicinity of the heating pipe so that the heater is automatically deenergized. In the case of the coffee maker of this type, when all of the water in the water reservoir is fed into the heating pipe and dripped into the drip case or when the drip operation is completed, the temperature around the heating pipe is rapidly increased. The temperature-sensing switch is automatically operated to deenergize the heater, in response to the rapid increase of the temperature around the heating pipe.

Should the effective cross sectional area of the heating pipe incorporated in the above-described coffee maker having the temperature-sensing switch be decreased owing to the incrustations and the like, the temperature around the heater would excessively be increased as mentioned above. Such excessive increase of the temperature around the heater causes the temperature-sensing switch to mistakenly operate. Consequently, the operation of the temperature sensing switch results in malfunction of the heater, that is, the heater is deenergized before all of the water in the water reservoir is fed or before the drip operation is completed.

Furthermore, when the affixing of the incrustations on the inside surface of the heating pipe progresses, impurities or foreign matter contained in the incrustations degrades the flavor of coffee to be made.

SUMMARY OF THE INVENTION

Therefore, an object of the present invention is to provide an improved coffee maker wherein the decrease of the effective cross sectional area of hot water feeding means such as a heating pipe provided between a water reservoir and a drip case for containing coffee powder to a predetermined value or below is automatically detected, thereby alarming a user by means of display or buzzer.

The coffee maker in accordance with the present invention comprises a hot water feeding means which is supplied with water at one of two ends thereof from a water reservoir and which feeds hot water from the other end thereof to an area communicating to the interior of a drip case for containing coffee powder, heating means for applying heat to the hot water feeding means to heat the water therein, and transferred heat detecting means for detecting an amount of heat transferred from the heating means to the hot water feeding means. As can be understood, the amount of heat transferred from the heating means to the hot water feeding means may be represented as a function of the amount of water flowing through the hot water feeding means. That is, the amount of heat consumed is decreased with decrease of the amount of water flowing through the hot water feeding means and accordingly, the amount of heat transferred from the heating means to the hot water feeding means is decreased. Consequently, a quantity of incrustations affixed on the inside surface of the hot water feeding means may be determined by detecting the amount of heat transferred from the heating means to the hot water feeding means. Upon the above-described principle, the amount of heat detected by the transferred heat detecting means is compared with a reference value by the operational means. When the amount of heat detected by the transferred heat detecting means takes a value below the reference value, the user is informed by means of display or buzzer that the incrustations above the predetermined amount are affixed on the inside surface of the hot water feeding means.

The present invention thus provides a coffee maker wherein the mixing of the incrustations in coffee owing to the affixing of the incrustations on the inside surface of the hot water feeding means may be prevented and wherein the coffee maker may be prevented from being continuously used in spite that the circumference of the heating means is being excessively heated.

According to another aspect of the present invention, the transferred heat detecting means comprises a temperature sensor for sensing the temperature of a heat transferring member provided between the heating means and the hot water feeding means and decision means for measuring a period of time required for the temperature of the heat transferring member to reach a reference value, in response to a signal supplied from the temperature sensor.

Since the time period decided by the decision means has a functional relation to the amount of water flowing in the hot water feeding means, the user is alarmed by means of display or buzzer when the time period decided by the decision means takes a value smaller than the reference value.

Other and further objects of this invention will become obvious upon an understanding of the illustrative embodiment about to be described or will be indicated in the appended claims, and various advantages not referred to herein will occur to one skilled in the art upon employment of the invention in practice.

DESCRIPTION OF THE PREFERRED EMBODIMENT

Figure 1:
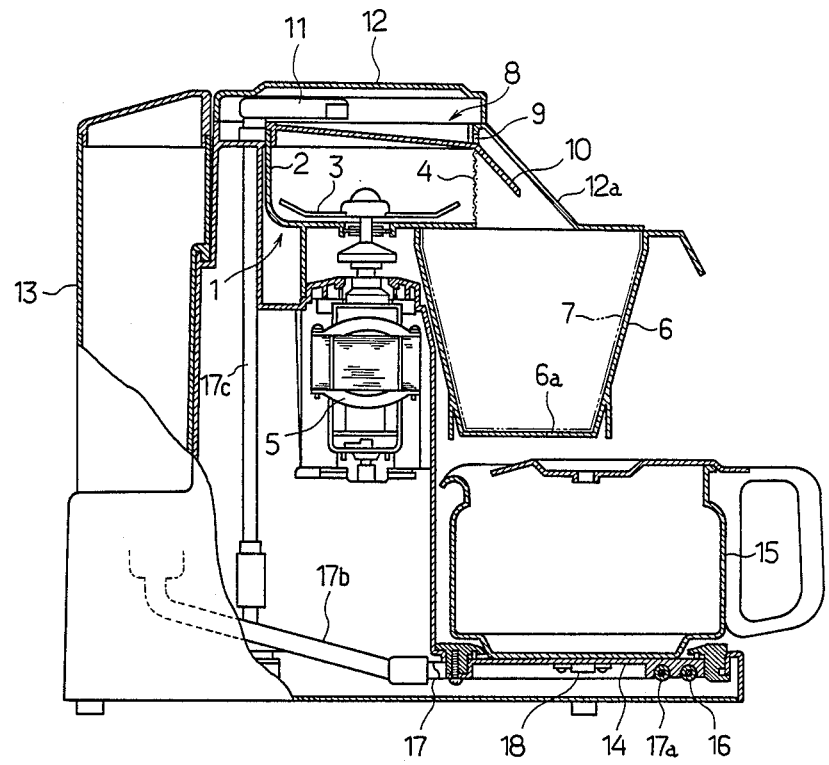
FIG. 1 is a longitudinal section of a coffee maker of one embodiment in accordance with the present invention.

One embodiment of the present invention will now be described with reference to the drawings. Referring first to FIG. 1 of the drawings, reference numeral 1 indicates a mill mechanism comprising a mill case 2 and a cutter 3 provided in the mill case 2. The mill case 2 has an open side portion to which a filter plate 4 is attached. When an electric motor 5 for driving the mill mechanism 1 is energized, the cutter 3 is rotated at high speed. A paper filter 7 configured into a container is placed on a drip case 6 which is adjacent to the mill mechanism 1. An upper opening of the drip case 6 faces the filter plate 4. Accordingly, when the motor 5 is energized with the mill case 2 filled with coffee beans, the coffee beans are milled into coffee powder by the cutter 3. Since the cutter 3 is rotated at high speed, the coffee powder is blown away into the paper filter 7 through the filter plate 4. The milling operation is thus performed.

Reference numeral 8 indicates a cap configured into a receptacle. The cap 8 is detachably mounted on the mill case 2. The bottom wall of the cap 8 is downwardly inclined in the right direction, as seen in FIG. 1. Apertures 9 are formed through a side wall upwardly extending from the lowest portion of the bottom wall of the cap 8. A guide plate 10 formed integrally with the bottom wall of the cap 8 is extended from the portion of the apertures 9 with downward inclination. The guide plate 10 is placed over the drip case 6. A hot water outlet 11 is mounted on the cap 8 for pivotal movement in the horizontal direction. A lid 12 is detachably mounted on the cap 8 so as to cover the hot water outlet 11. A cover portion 12a integrally formed with the lid 12 closes the upper opening of the drip case 6 when the lid 12 is mounted on the cap 8.

Reference numeral 13 indicates a water reservoir to which a desired amount of water is supplied for extraction of coffee. A bottle or container 15 is placed on a heat transfer member such as a hot plate 14. A sheathed heater 16 as heating means and a metallic heating pipe 17 as hot water feeding means are provided on the underside of the hot plate 14 so as to be disposed in parallel with and adjacent to each other. The heating pipe 17 comprises an arc-shaped main pipe portion 17a positioned on the underside of the hot plate 14 and two auxiliary pipe portions 17b and 17c connected to both ends of the main pipe portion 17a, respectively. One of the ends of the main pipe portion 17a communicates to the bottom of the water reservoir 13 through the auxiliary pipe portion 17b and a check valve (not shown). The other end of the main pipe portion 17a communicates to the hot water outlet 11 through the auxiliary pipe portion 17c. Accordingly, when the sheathed heater 16 is energized to generate heat, the water fed to the heating pipe 17 from the water reservoir 13 is heated in the heating pipe 17, specifically, in the main pipe portion 17a, thereby obtaining hot water. The boiling pressure causes the hot water to flow through the auxiliary pipe portion 17c. From the hot water outlet 11, the hot water is dripped down into the drip case 6 through the apertures 9 of the cap 8 and the guide plate 10. The hot water thus fed into the drip case 6 is brought into contact with the coffee powder provided in the paper filter 7, therey obtaining coffee extracts. The hot water containing the coffee extracts is dripped into the container 15 through apertures 6a formed in the bottom wall of the drip case 6, thereby obtaining coffee and completing the drip operation.

A thermostat 18 serving as a temperature sensor is provided on the underside of the hot plate 14 so as to detect the temperature of the hot plate 14. The thermostat 18 is provided for obtaining a drip operation completion signal for deenergizing the sheathed heater 16 when the feeding of hot water from the heating pipe 17 is completed and for detecting an abnormal state of the heating pipe 17, which state will hereinafter be described in detail. The thermostat 18 is arranged into a normally closed type and accordingly, turned off when the temperature detected by the thermostat 18 exceeds a hot water feed completion temperature (preset temperature) Ts, for example, 120° C.

Figure 2:
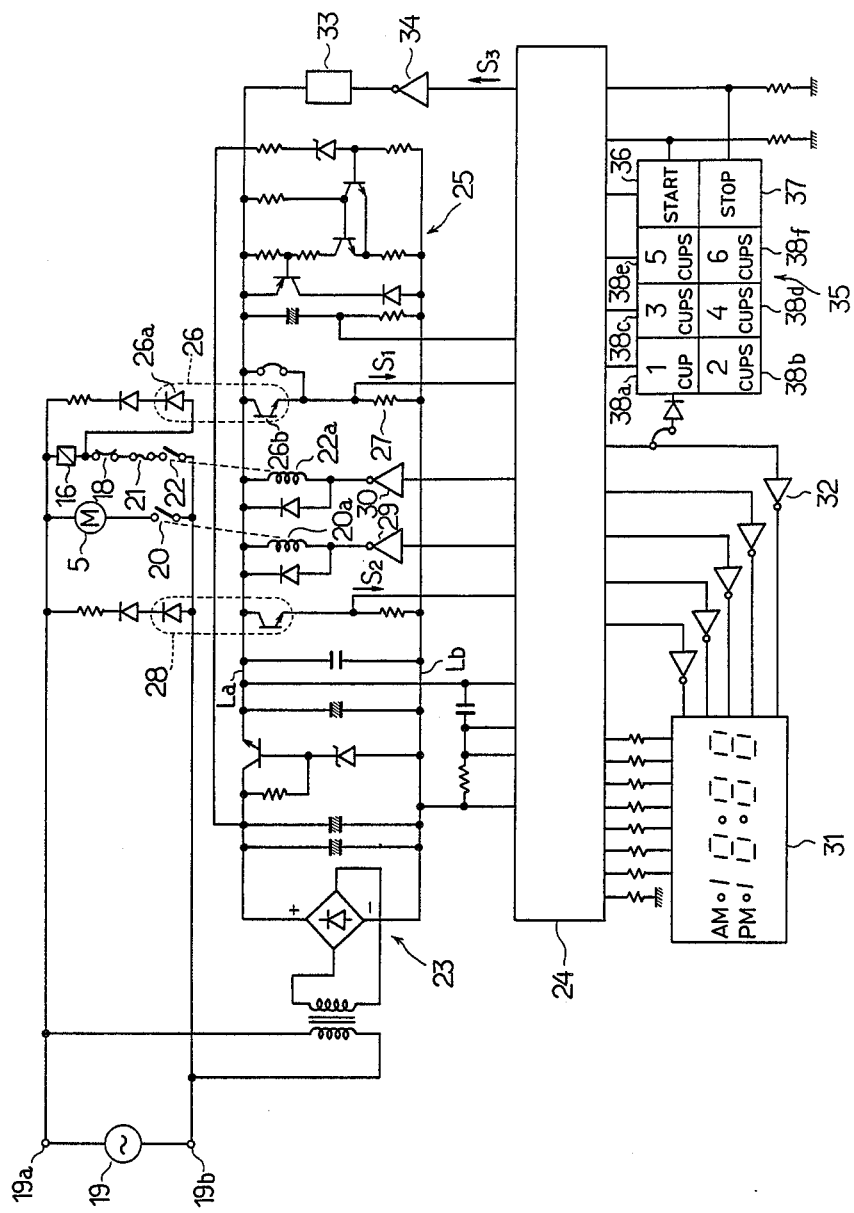
FIG. 2 is a circuit diagram illustrating a microcomputer and additional circuits incorporated in the coffee maker.

FIG. 2 illustrates electrical circuit arrangements of the coffee maker described above. In FIG. 2, terminals 19a and 19b are connected to an AC power-source 19. The motor 5 is connected between the terminals 19a and 19b through a relay switch 20. The sheathed heater 16 is also connected between the terminals 19a and 19b through the thermostat 18 and a thermal fuse 21 and a relay switch 22. A DC power-source circuit 23 arranged in the manner well known in the art is supplied with electrical power from the terminals 19a and 19b. The electrical power is supplied from positive and negative output lines La and Lb to relay coils 20a and 22a of the respective relay switches 20 and 22, a microcomputer 24 as operational means, an initializing circuit 25 of the microcomputer 24 and the like.

A photocoupler 26 produces a signal when the thermostat 18 is turned off. A light-emitting diode 26a of the photocoupler 26 is activated in the condition that the thermostat 18 and the relay switch 22 are turned on. The collector of a phototransistor 26b of the photocoupler 26 is connected to the output line La and the emitter thereof is connected to the output line Lb through a resistor 27. Accordingly, when the thermostat 18 is turned off, a low voltage level OFF signal S1 is produced by the phototransistor 26 which is turned off in response to the turn-off of the thermostat 18. The OFF signal S1 is supplied from the emitter of the phototransistor 26 to the microcomputer 24.

A photocoupler 28 produces clock pulses S2 synchronized with the frequency of the current supplied from the AC power-source 19. The clock pulses S2 are supplied to the microcomputer 24. A clock pulse generating source for the execution of a coffee extracting program is separately provided in the microcomputer 24. Reference numerals 29 and 30 indicate switch drivers for the relay coils 20a and 22a, respectively. When a command signal is supplied to each of the switch drivers 29 and 30 from the microcomputer 24, each of the relay coils 20a and 22a is energized. A digital display unit 31 is provided for displaying the current time, sequentially changing lapse of time from the start of the coffee extraction to the current time, and the like. The digital display unit 31 is controlled by the microcomputer 24 through switch drivers 32. An electronic buzzer 33 is turned on through a switch driver 34 when an alarm signal S3 is produced by the microcomputer 24, as will hereinafter be described in detail. Reference numeral 35 indicates an operation panel on which a start switch 36, a stop switch 37 and, for example, six select switches 38a–38f for setting an amount of coffee to be made based on the number of cups are provided. These switches 36, 37 and 38a–38f are arranged into a key matrix circuit. Accordingly, when each of these switches are turned on, a switch signal specifying on-state of each switch is supplied to the microcomputer 24.

One of the select switches 38a–38f is manually operated so that an amount of water supplied in the water reservoir 13 corresponds to the number of cups, whereby data of an amount of coffee to be made is supplied to the microcomputer 24. This data is used for the setting of a time period of the mill operation by the cutter 3.

Figure 4:
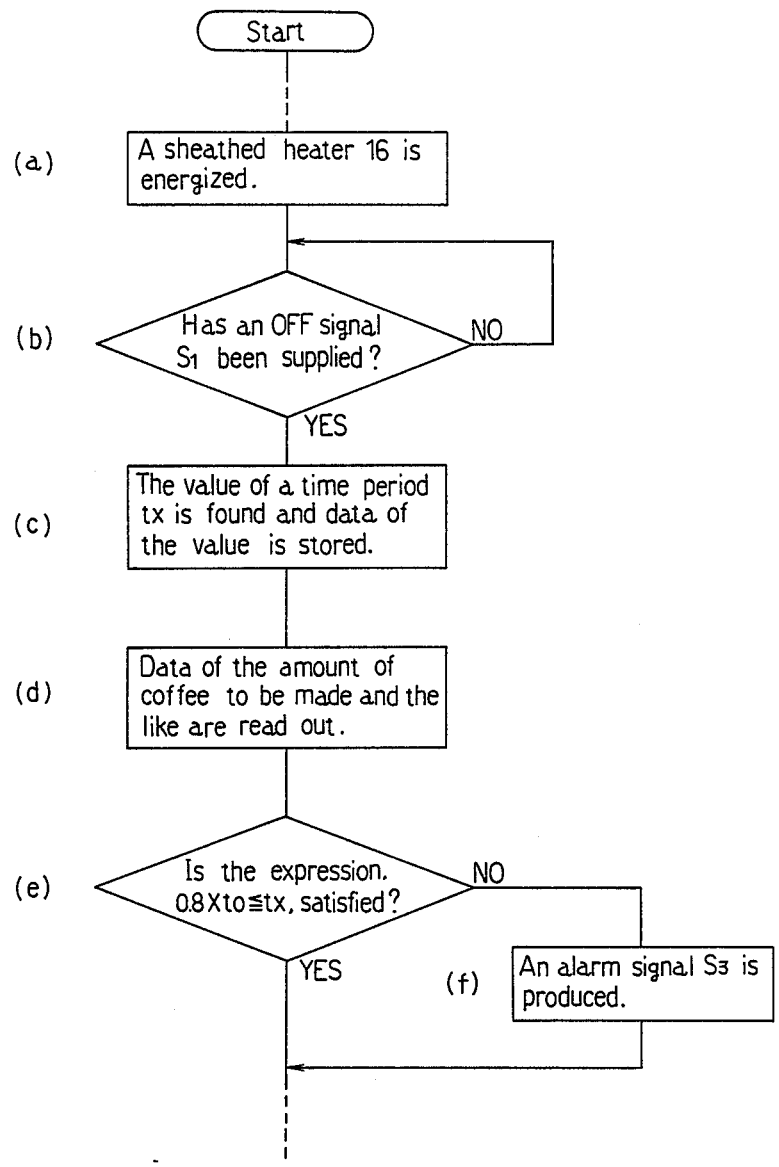
FIG. 4 is a flow chart illustrating a major part of the operation of the microcomputer shown in FIG. 2.

The microcomputer 24 controls on-off states of the relay switches 20 and 22 in accordance with the OFF signal S1 from the photocoupler 26, the clock pulses S2 from the photocoupler 28, the switch signal from the operation panel 35, a program prestored therein and the like, thereby executing the above-described mill and drip operations. The flow chart of FIG. 4 shows part of the controlling operation of the microcomputer 24, which part is closely related to the subject matter of the present invention. In FIG. 4, when the thermostat 18 is turned off with the OFF signal S1 supplied to the microcomputer 24 during the energization of the sheathed heater 16, that is, when the sheathed heater 16 is deenergized, the microcomputer 24 operates to measure a time period tx between the start time of the energization of the sheathed heater 16 and the time of the input of the OFF signal S1 and stores data of the time period tx measured. The microcomputer 24 reads out the data of the number of cups stored therein based on the switch signal supplied from any one of the select switches 38a–38f (or the data of a normal time period t0 required for the drip operation to obtain an amount of coffee corresponding to the selected number of cups and the like) at steps a, b, c and d. Based on the data read out and the data of the above-mentioned time period tx, the microcomputer 24 executes a decision step e. In the decision step e, whether or not the relation between the normal drip time period t0 based on the data of the number of cups and the time period tx is shown by the expression, $0.8 \times t0 \leq tx$, is decided. When the decision is made that the relation between the time periods t0 and tx is shown by the expression, the microcomputer 24 continues to execute the control operation. When the decision is made that the relation between the time periods t0 and tx is not shown by the expression, the microcomputer 24 produces the alarm signals S3 for a predetermined period to thereby energize the electronic buzzer 33 (at step f) and afterwards, restarts executing the control operation with the deenergization of the electronic buzzer 33. In other words, the time period tx for which the temperature sensed by the thermostat 18 after the start of the energization of the sheathed heater 16 reaches a hot water feed completion temperature Ts is measured by the microcomputer 24. The microcomputer 24 produces the alarm signal S3 when the time period tx takes the value below 0.8t0.

Figure 3:
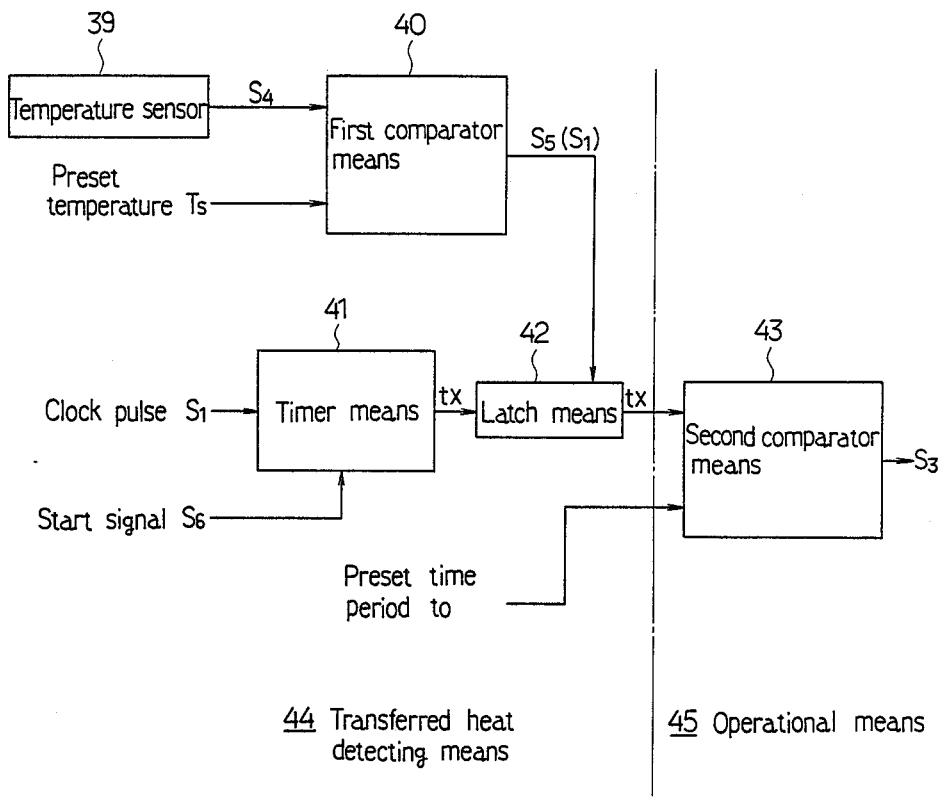
FIG. 3 is a block diagram explaining the decision of the amount of heat transferred from the sheathed heater to the heating pipe.

FIG. 3 is a block diagram illustrating the functions of the microcomputer 24 shown in FIG. 4. Referring to FIG. 3, the thermostat 18 comprises a temperature sensor 39 and a first comparator means 40 for comparing a detection signal S4 supplied from the temperature sensor 39 with a preset temperature Ts to thereby produce a preset temperature reach signal S5 (identical with the OFF signal S1). The above-described functions of the temperature sensor 39 and the first comparator means 40 correspond to those shown in the steps a and b in FIG. 4. The function shown in the step c in FIG. 4 corresponds to those of a timer means 41 and a latch means 42. For example, when supplied with a start signal S6, the timer means 41 starts the time counting operation with a start time as the time when the sheathed heater 16 is energized, by counting the clock pulses S2. When the level of the detection signal S4 supplied from the temperature sensor 39 reaches that of the preset temperature Ts, the output signal S5 is supplied from the first comparator means 40 and the output of the timer means 41 is latched as a period of time of the drip operation by the latch means 42. The functions shown in the steps d, e and f in FIG. 4 correspond to those of a second comparator means 43. The second comparator means 43 is supplied with a signal representing the preset value t0 of the normal drip operation time period. The second comparator means 43 compares the preset value t0 with the time period tx, thereby producing the alarm signal S3 when the decision is made that the relation between the preset value t0 and the time period tx is shown by the expression, $0.8 \times t0 \leq tx$.

The drip time period tx is represented as a function of an amount of water flowing through the heating pipe 17, that is, an amount of heat transferred from the sheathed heater 16 to the heating pipe 17. Accordingly, the temperature sensor 39, the first comparator means 40, the timer means 41 and the latch means 42 constitute a transferred heat detecting means 44. An operational means 45 comparing the amount of heat transferred from the sheathed heater 16 to the heating pipe with a preset value includes the second comparator means 43.

Figure 5:
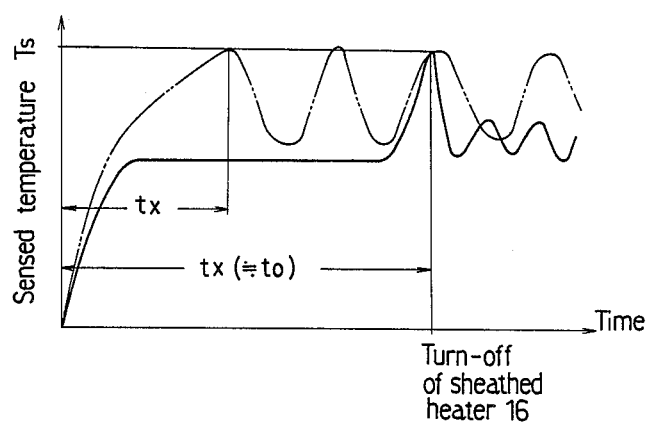
FIG. 5 is a graph representing the temperature characteristics of a heat transferring member serving as an object of the transferred heat detecting means.

Operation of the coffee maker in accordance with this invention will now be described. When the drip operation is to be performed, the temperature detected by the thermostat 18 changes with progress of the drip operation in the normal state of the heating pipe 17 wherein the effective cross sectional area of the heating pipe 17 is maintained at a predetermined value, and the changes are shown by solid line in FIG. 5. The sheathed heater 16 is deenergized when the temperature detected by the thermostat 18 reaches the hot water feed completion temperature Ts. Whereas, long time use of the coffee maker causes the incrustations and the like to be affixed on the inside surface of the heating pipe 17, thereby gradually decreasing the effective cross sectional area of the heating pipe 17. Consequently, since the amount of water flowing through the heating pipe 17 is decreased, the amount of heat applied to the heating pipe 17 by the sheathed heater 16 (or an amount of heat consumed within the heating pipe 17) is decreased. In this state of condition, the temperature of the hot plate 14 is raised higher than in the normal state of the heating pipe 17 and accordingly, the temperature detected by the thermostat 18 is increased earlier than in the normal state, as shown by alternate long and two short dashes line in FIG. 3. Consequently, the time period tx between the start of the energization of the sheathed heater 16 and the turn-off of the thermostat 18 is shortened with the increase of the incrustations affixed on the inside surface of the heating pipe 17. The alarm signal S3 is produced by the micro-computer 24 to thereby activate the electronic buzzer 33 when the time period tx is decreased to the value of 80% of the normal operation period tO or below, or when the relation between the time periods tx and tO is shown by the expression, $0.8 \times t0 \leq tx$. The activation of the electronic buzzer 33 informs the user that the incrustations exceeding a predetermined amount are affixed on the inside surface of the heating pipe 17. In this case, the drip operation may be executed with the water reservoir 13 filled with dilute vinegar, thereby removing the incrustations affixed on the inside surface of the heating pipe 17. The value of 80% of the normal operation period to with the time period tx is selected so that the alarm signal S3 is not mistakenly produced by the microcomputer 24 with the temperature of the water supplied to the water reservoir 13 and variations of the output of the sheathed heater 16 taken into consideration.

The foregoing disclosure and drawings are merely illustrative of the principles of the present invention and are not to be interpreted in a limiting sense. The only limitation is to be determined from the scope of the appended claims.

What is claimed is:

1. A coffee maker comprising:
   (a) a water reservoir;
   (b) a drip case for containing coffee powder;
   (c) hot water feeding means having two ends, said hot water feeding means being supplied with water through one of the ends thereof from said water reservoir, said hot water feeding means feeding hot water from the other end thereof to an area communicating to the interior of said drip case;
   (d) heating means for applying heat to said hot water feeding means to heat the water therein, thereby causing the hot water to flow through said hot water feeding means to the end thereof communicating to the interior of said drip case, by the force of boiling pressure;
   (e) transferred heat detecting means for detecting an amount of heat transferred from said heating means to said hot water feeding means; and
   (f) operational means for comparing an amount of heat detected by said transferred heat detecting means with a predetermined value, thereby producing an alarm signal when the amount of heat detected by said transferred heat detecting means takes a value smaller than the predetermined value.

2. A coffee maker comprising:
   (a) a water reservoir;
   (b) a drip case for containing coffee powder;
   (c) hot water feeding means having two ends, said hot water feeding means being supplied with water through one of the ends thereof from said water reservoir, said hot water feeding means feeding hot water from the other end thereof to an area communicating to the interior of said drip case;
   (d) heating means for applying heat to said hot water feeding means through a heat transferring member, thereby causing the hot water to flow through said hot water feeding means toward the end thereof communicating to said drip case, by the force of boiling pressure;
   (e) a temperature sensor for sensing the temperature of the heat transferring member, thereby producing a signal in accordance with the temperature sensed;
   (f) decision means for deciding a period of time required for the temperature of the heat transferring member to reach a predetermined temperature, in response to the signal supplied from said temperature sensor; and
   (g) operational means for comparing the time period decided by said decision means with a predetermined time period, thereby producing an alarm signal when the time period decided by said decision means takes a smaller value than the predetermined time period.

* * * * *